(12) United States Patent
Beaven et al.

(10) Patent No.: US 9,970,313 B2
(45) Date of Patent: May 15, 2018

(54) UNISON RING ASSEMBLY

(71) Applicant: ROLLS-ROYCE PLC, London (GB)

(72) Inventors: David Michael Beaven, Nottingham (GB); Kenneth John Mackie, Derby (GB); Richard Geoffrey Stretton, Leicester (GB)

(73) Assignee: ROLLS-ROYCE plc, London (GB)

( * ) Notice: Subject to any disclaimer, the term of this patent is extended or adjusted under 35 U.S.C. 154(b) by 309 days.

(21) Appl. No.: 14/716,199

(22) Filed: May 19, 2015

(65) Prior Publication Data

US 2015/0361818 A1 Dec. 17, 2015

(30) Foreign Application Priority Data

Jun. 16, 2014 (GB) .................................. 1410674.4

(51) Int. Cl.
*F01D 17/10* (2006.01)
*F01D 15/02* (2006.01)
*B64C 11/30* (2006.01)

(52) U.S. Cl.
CPC ............ *F01D 17/10* (2013.01); *B64C 11/306* (2013.01); *F01D 15/02* (2013.01); *F05D 2220/36* (2013.01); *F05D 2260/79* (2013.01)

(58) Field of Classification Search
CPC ... B64C 11/306; B64C 11/32; F05D 2260/72; F05D 2260/74; F05D 2260/79; F01D 17/10; F01D 17/162; F04D 29/362
USPC ....................................................... 416/167
See application file for complete search history.

(56) References Cited

U.S. PATENT DOCUMENTS

| 3,558,237 | A | * | 1/1971 | Wall, Jr. | ................ F01D 17/162 415/115 |
| 3,795,463 | A | * | 3/1974 | Herbert | .................... B63H 3/02 416/160 |
| 4,630,999 | A | * | 12/1986 | De La Harpe | ............ F01D 7/00 416/147 |
| 4,925,364 | A | * | 5/1990 | Das | ....................... F01D 17/162 411/183 |

(Continued)

FOREIGN PATENT DOCUMENTS

| EP | 1564380 A1 * | 8/2005 | ........... F01D 17/165 |
| EP | 1722073 A1 | 11/2006 | |

(Continued)

OTHER PUBLICATIONS

Stclairwestern. "Model Ferris Wheel setup-time lapse" Accessed on May 11, 2017 from https://www.youtube.com/watch?v=wcPuENSv5hA, available as of Jan. 15, 2009.*

(Continued)

*Primary Examiner* — Ninh H Nguyen
*Assistant Examiner* — Topaz L Elliott
(74) *Attorney, Agent, or Firm* — Oliff PLC

(57) ABSTRACT

A unison ring assembly comprises a backing plate, and a plurality of pocket-forming portions. The backing plate is formed as an annular disc, with the annular disc being planar in a radial plane of the unison ring assembly. The plurality of pocket-forming portions are equi-spaced circumferentially around the axis of the unison ring assembly, and each of the plurality of pocket-forming portions is attached to the backing plate to form a corresponding radially extending pocket.

4 Claims, 5 Drawing Sheets

(56) References Cited

U.S. PATENT DOCUMENTS

| | | | | |
|---|---|---|---|---|
| 5,118,253 | A * | 6/1992 | Balkcum, III | F01D 25/246 |
| | | | | 415/189 |
| 5,324,164 | A * | 6/1994 | Doering | F03B 17/067 |
| | | | | 415/150 |
| 5,797,802 | A * | 8/1998 | Nowak | B23G 5/12 |
| | | | | 470/185 |
| 8,328,512 | B2 * | 12/2012 | Major | F01D 17/162 |
| | | | | 415/209.4 |
| 8,459,938 | B2 * | 6/2013 | Fath | F01D 17/165 |
| | | | | 228/110.1 |
| 2007/0248298 | A1 * | 10/2007 | Chihara | B23P 15/003 |
| | | | | 384/579 |
| 2009/0162192 | A1 | 6/2009 | McCaffrey | |
| 2011/0182717 | A1 * | 7/2011 | Tries | F01D 17/165 |
| | | | | 415/160 |

FOREIGN PATENT DOCUMENTS

| | | | | |
|---|---|---|---|---|
| EP | 2340993 | A2 | 7/2011 | |
| GB | 1406834 | A | 9/1975 | |
| GB | 2051967 | A * | 1/1981 | F01D 7/00 |

OTHER PUBLICATIONS

Dec. 12, 2014 Search Report issued in British Patent Application No. 1410674.4.

\* cited by examiner

UNISON RING ASSEMBLY

This disclosure claims the benefit of UK Patent Application No. GB 1410674.4, filed on 16 Jun. 2014, which is hereby incorporated herein in its entirety.

FIELD OF THE INVENTION

The present invention relates to a unison ring assembly and particularly, but not exclusively, to a unison ring assembly for an aircraft having contra-rotating propellers.

BACKGROUND TO THE INVENTION

It is well known to vary the pitch of the blades on an aircraft propeller, for example in order to maintain the rotational speed of the propeller within close limits. This in turn provides improved performance over a wide range of flight conditions, and enables thrust reversal during landing and ground maneuvering of the aircraft.

A conventional unison ring 10 is formed as an annular ring having a 'U'-shaped axial cross-section 50 as shown in FIG. 1. The 'U'-shaped cross-section 50 is formed from a first side member 20 and a second side member 30 that are respectively connected to opposing ends of a floor member 40.

This 'U'-shaped channel 50 accommodates the lever arms 62 that operate the propeller pitch change spindles 64. Each lever arm 62 comprises a lever arm peg 60 that is accommodated within the "U"-shaped cross-section 50. Each of the pitch change spindles is connected to a corresponding propeller blade (not shown). A pitch change actuator is used to produce axial movement 70 of the unison ring 10, and corresponding axial movement 72 of the lever arm peg 60, which in turn causes rotational movement of the lever arms 62 connected to the pitch change spindles 64, and thus pitch change of the propeller blades.

The unison ring acts as a common point of load transference between the pitch change actuator and the individual propeller blades. As such it is a critical part of the propeller pitch change mechanism.

It also importantly allows for the feathering of the propeller in the event of an engine shutdown in flight. When an engine is shutdown in flight, an unfeathered propeller presents a large and flat surface to the oncoming airflow. This will cause a large drag force on the aircraft which can result in a loss of control of the aircraft.

While it is known to use a pitch lock mechanism to force an unfeathered propeller into a safe feathered position, such mechanisms are complex and heavy, particularly when implemented in an aircraft powerplant having twin contra-rotating propellers.

Even where a pitch lock mechanism is provided, a failure in the unison ring assembly will generally result in the aircraft mission being aborted.

It is desirable to provide a unison ring assembly for a contra-rotating propeller system that provides improved resistance to the initiation and propagation of cracks.

Statements of Invention

According to a first aspect of the present invention there is provided a unison ring assembly comprising:
 a plurality of lever arms;
 a plurality of pitch change spindles;
 a planar backing plate; and
 a plurality of pocket-forming portions;
  wherein the backing plate is formed as an annular disc, the annular disc being planar in a radial plane of the unison ring assembly, the plurality of pocket-forming portions are equi-spaced circumferentially around the axis of the unison ring assembly, and each of the plurality of pocket-forming portions is attached to the backing plate to form a corresponding radially outwardly opening pocket, with each picket accommodating a respective one of the lever arms, and each lever arm being operable connected to a respective one of the pitch change spindles.

The use of separate pocket-forming portions which are then attached to the backing plate makes the assembly less susceptible to cracks forming at the edges of the resulting pockets.

The separate pocket-forming portions can be individually attached to the backing plate making the assembly of the unison ring simpler and more convenient for a user.

Optionally, each of the plurality of pocket-forming portions is 'C'-shaped in circumferential cross-section.

The resulting 'C'-shaped pocket conformally accepts the drive pin for the corresponding propeller blade pitch adjustment. This ensures that the transfer of loads from the unison ring assembly to the drive pin is direct thus making the unison ring assembly less susceptible to cracking.

Optionally, the plurality of pocket-forming portions is removably attached to the backing plate.

This enables the unison ring assembly to be dismantled for service and repair, thus making the assembly more convenient and cost effective for a user.

Optionally, the plurality of pocket-forming portions is formed integrally.

By forming the pocket-forming portions as an integral part the weight of the unison ring assembly may be reduced which makes it more suitable for weight critical applications.

Optionally, the backing plate comprises a plurality of backing plate portions, each of the plurality of backing plate portions corresponding to a respective one of the pocket-forming portions.

The use of separate backing plate portions for each of the pockets in the unison ring assembly ensures that the point of closure for any one of the pockets is isolated from that for any other one of the pockets. This prevents any cracks initiated at one of the pocket-forming portions from spreading to an adjacent pocket-forming portion.

Optionally, each of the backing plate portions is removably attached to the plurality of pocket-forming portions.

This enables the unison ring assembly to be dismantled for service and repair, thus making the assembly more convenient and cost effective for a user.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 2:
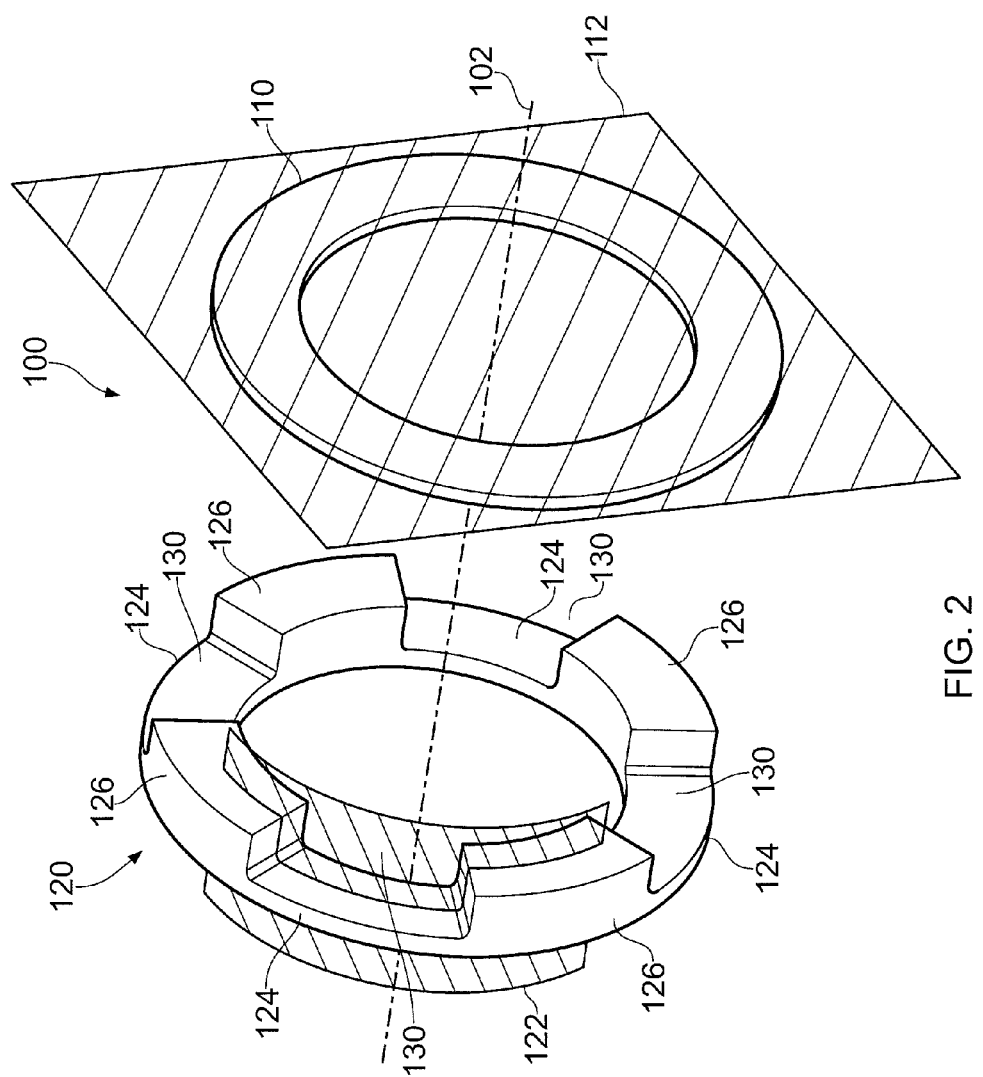
FIG. 2 shows an exploded perspective view of a unison ring assembly according to a first embodiment of the invention.

Referring to FIG. 2, a unison ring assembly according to a first embodiment of the invention is designated generally by the reference numeral 100.

The unison ring assembly 100 comprises a backing plate 110 and plurality of pocket-forming portions 120.

Figure 1:
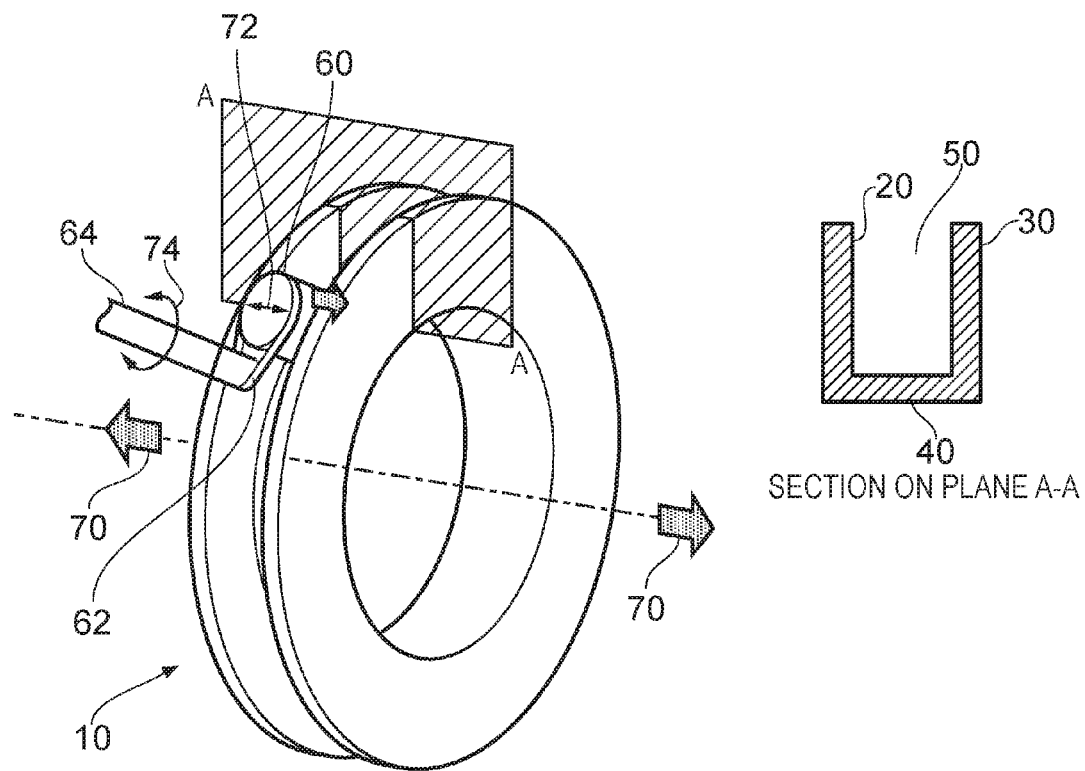
FIG. 1 shows a perspective view of a unison ring according to the prior art.

The backing plate 110 is formed as an annular disc that is planar in the radial plane 112 of the unison ring assembly 100. The backing plate 110 corresponds functionally to one of the first and second side members 20,30 of the prior art unison ring illustrated in FIG. 1.

Each of the plurality of pocket-forming portions 120 is equi-spaced circumferentially around the axis 102 of the unison ring assembly 100. Each of the plurality of pocket-forming portions 120 comprises a circumferentially extending portion 124 connecting two axially extending portions 126.

In this embodiment, the plurality of pocket-forming portions 120 is integrally formed with one another. In other words the axially extending portion 126 at one end of one pocket-forming portion 120 is connected to and integral with the axially extending portion 126 at the corresponding opposite end of an adjacent pocket-forming portion 120.

The plurality of pocket-forming portions 120 is attached in co-axial alignment to the backing plate 110 such that each pocket-forming portion 120 forms a corresponding radially extending pocket 130.

Each of the plurality of pocket-forming portions 120 is 'C'-shaped when viewed in the circumferential plane 122.

In the present arrangement the backing plate 110 and the plurality of pocket-forming portions 120 are both formed from a titanium alloy. In other arrangements, the backing plate 110 and the plurality of pocket-forming portions 120 may be formed from another metal or metal alloy, or from a fibre-reinforced composite material.

The backing plate 110 and the plurality of pocket-forming portions 120 are welded to one another to form the unison ring assembly 100. In other arrangements, the backing plate 110 and the plurality of pocket-forming portions 120 may be joined to one another by another fastening method such as, for example, bolting, riveting or adhesively bonding.

In use, each of the pockets 130 accommodates a respective one of the lever arms (not shown) that operate the pitch change spindles (also not shown). In this regard, the pockets correspond functionally to the 'U'-shaped channel 50 of the prior art unison ring 10 shown in FIG. 1.

Figure 3:
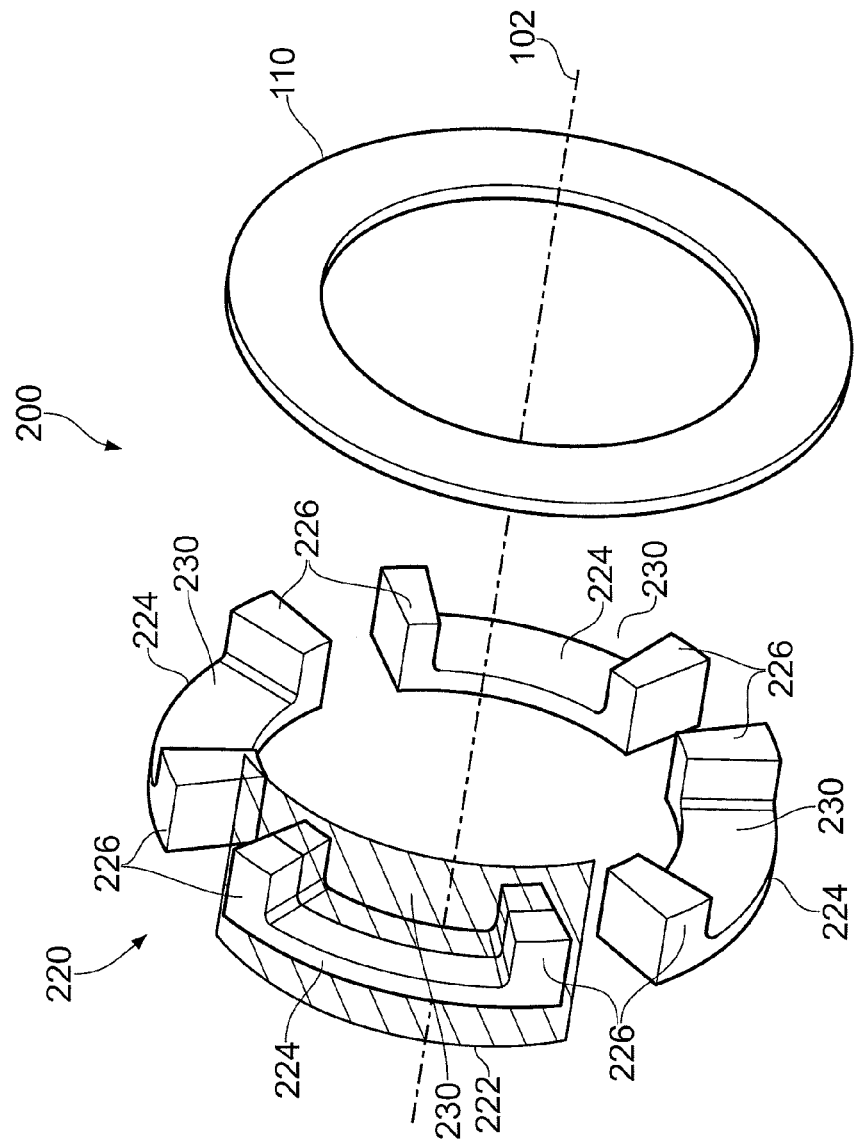
FIG. 3 shows an exploded perspective view of a unison ring assembly according to a second embodiment of the invention.

Referring to FIG. 3, a unison ring assembly according to a second embodiment of the invention is designated generally by the reference numeral 200. Features of the unison ring assembly 200 which correspond to those of unison ring assembly 100 have been given corresponding reference numerals for ease of reference.

The unison ring assembly 200 has a backing plate 110 and plurality of pocket-forming portions 220.

Each of the plurality of pocket-forming portions 220 is equi-spaced circumferentially around the axis 102 of the unison ring assembly 200. Each of the plurality of pocket-forming portions 220 comprises a circumferentially extending portion 224 connecting two axially extending portions 226.

In this embodiment, each of the plurality of pocket-forming portions 220 is separate from each other. In other words the axially extending portion 226 at one end of one pocket-forming portion 220 is separate to and spaced apart from the axially extending portion 226 at the corresponding opposite end of an adjacent pocket-forming portion 220.

The plurality of pocket-forming portions 220 is attached in co-axial alignment to the backing plate 110 such that each pocket-forming portion 220 forms a corresponding radially extending pocket 230.

As for the previous embodiment, each of the plurality of pocket-forming portions 220 is 'C'-shaped when viewed in the circumferential plane 222.

In the present arrangement the backing plate 110 and the plurality of pocket-forming portions 220 are both formed from a titanium alloy with the backing plate 110 and the plurality of pocket-forming portions 220 being welded to one another to form the unison ring assembly 200.

Figure 4:
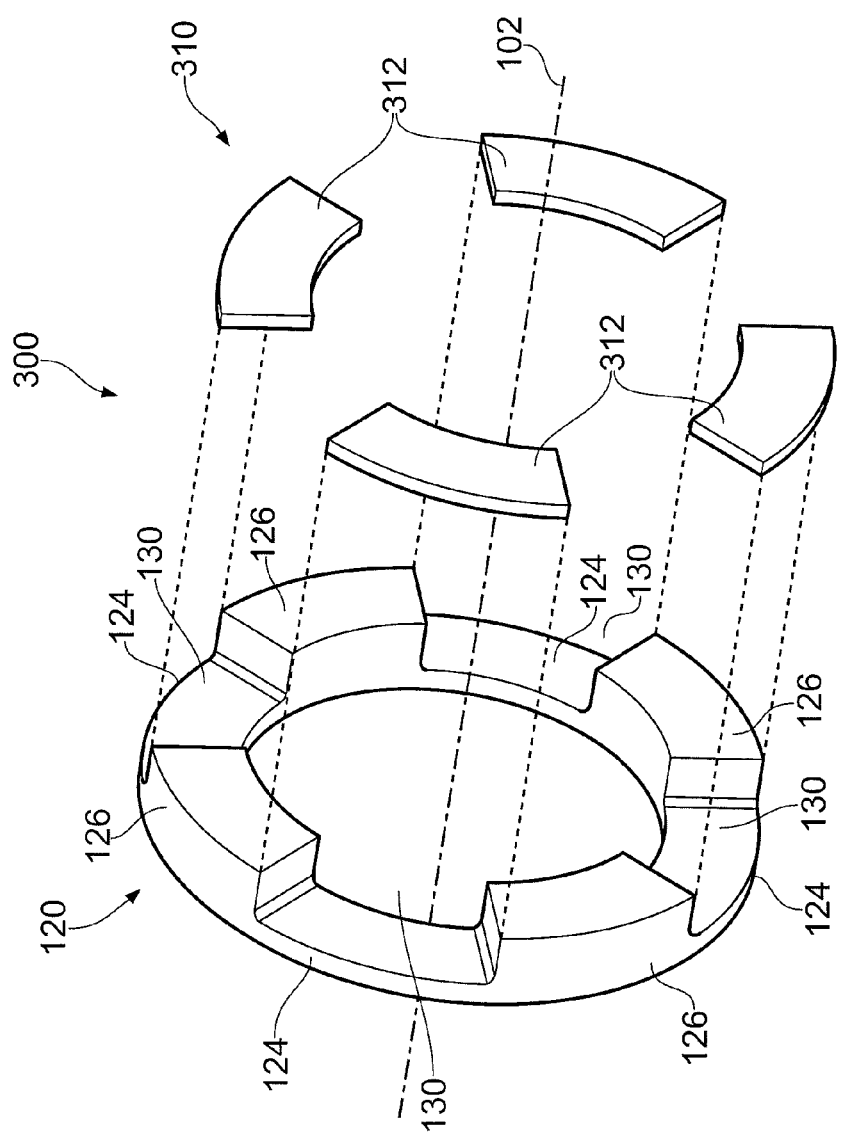
FIG. 4 shows an exploded perspective view of a unison ring assembly according to a third embodiment of the invention.

Referring to FIG. 4, a unison ring assembly according to a third embodiment of the invention is designated generally by the reference numeral 300. Features of the unison ring assembly 300 which correspond to those of unison ring assembly 100,200 have been given corresponding reference numerals for ease of reference.

The unison ring assembly 300 comprises a backing plate 310 and plurality of pocket-forming portions 120.

The backing plate 310 comprises a plurality of backing plate portions 312. Each of the backing plate portions 312 is equi-spaced circumferentially around the axis 102 of the unison ring assembly 300.

The plurality of backing plate portions 312 are arranged as a segmented annular disc that is planar in the radial plane 112 of the unison ring assembly 300. As for the earlier described embodiments, the backing plate 310 corresponds functionally to one of the first and second side members 20,30 of the prior art unison ring illustrated in FIG. 1.

Each of the plurality of pocket-forming portions 120 comprises a circumferentially extending portion 124 connecting two axially extending portions 126.

In this embodiment, the plurality of pocket-forming portions 120 is integrally formed with one another. In other words the axially extending portion 126 at one end of one pocket-forming portion 120 is connected to and integral with the axially extending portion 126 at the corresponding opposite end of an adjacent pocket-forming portion 120.

The plurality of pocket-forming portions 120 is attached in co-axial alignment to the backing plate 310 such that each pocket-forming portion 120 forms a corresponding radially extending pocket 130.

In this embodiment the backing plate 310 and the plurality of pocket-forming portions 120 are both formed from a titanium alloy with the backing plate 310 and the plurality of pocket-forming portions 120 being welded to one another to form the unison ring assembly 300.

Figure 5:
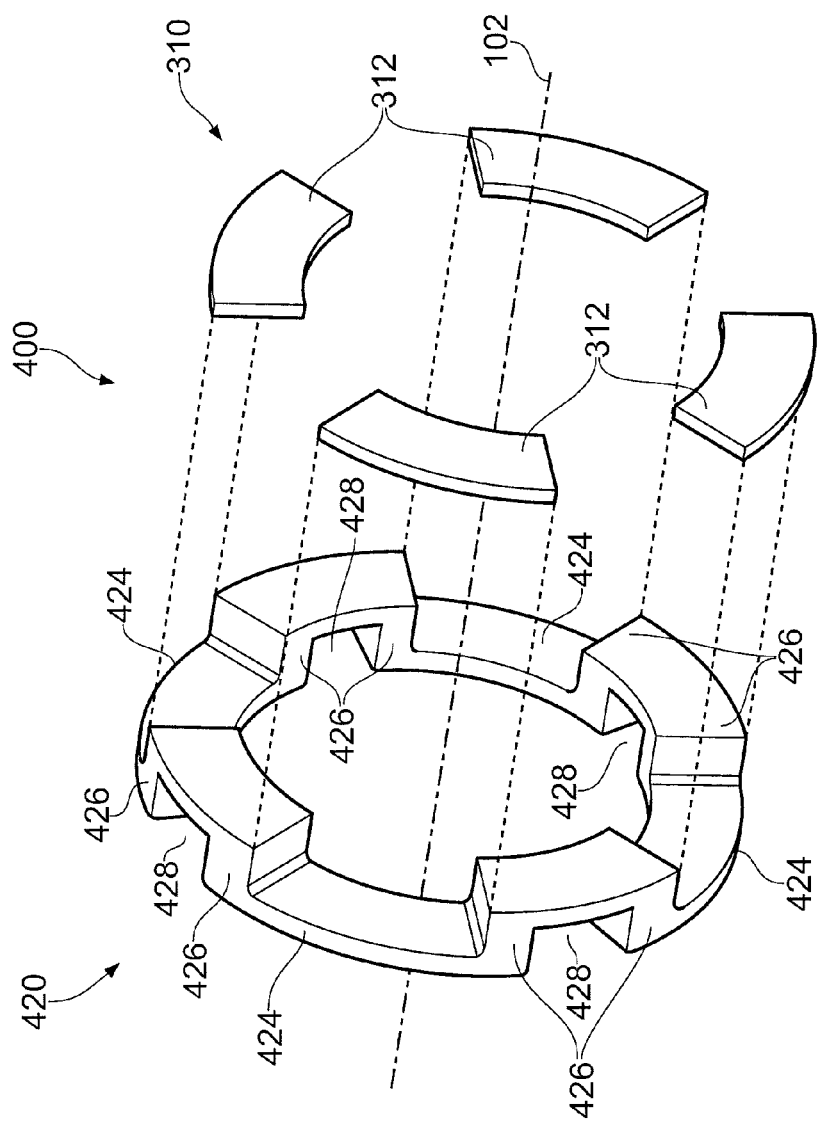
FIG. 5 shows an exploded perspective view of a unison ring assembly according to a fourth embodiment of the invention.

Referring to FIG. 5, a unison ring assembly according to a fourth embodiment of the invention is designated generally by the reference numeral 400. Features of the unison ring assembly 400 which correspond to those of unison ring assembly 300 have been given corresponding reference numerals for ease of reference.

The unison ring assembly 400 comprises a backing plate 310 and plurality of pocket-forming portions 420.

The backing plate 310 comprises a plurality of backing plate portions 312. Each of the backing plate portions 312 is equi-spaced circumferentially around the axis 102 of the unison ring assembly 300.

Each of the plurality of pocket-forming portions 420 comprises a circumferentially extending portion 424 connecting two axially extending portions 426.

As described above with regard to the third embodiment, the plurality of pocket-forming portions 420 is integrally formed with one another. In other words the axially extending portion 426 at one end of one pocket-forming portion 420 is connected to and integral with the axially extending portion 426 at the corresponding opposite end of an adjacent pocket-forming portion 420.

In addition, the plurality of pocket-forming portions 420, which are integrally formed, also include a plurality of recesses 428. Each of these recesses 428 is positioned between adjoining axially extending portions 426 of adjacent pocket-forming portions 420. Each recess extends axially into the integrally formed pocket-forming portions 420.

The plurality of pocket-forming portions 420 is attached in co-axial alignment to the backing plate 310 such that each pocket-forming portion 420 forms a corresponding radially extending pocket 430.

In this embodiment the backing plate 310 and the plurality of pocket-forming portions 420 are both formed from a titanium alloy with the backing plate 310 and the plurality of pocket-forming portions 420 being welded to one another to form the unison ring assembly 300.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A unison ring assembly comprising:
   a plurality of lever arms;
   a plurality of pitch change spindles;
   a planar backing plate; and
   a plurality of pocket-forming portions, wherein
   the backing plate is formed as an annular disc, the annular disc being planar in a radial plane of the unison ring assembly,
   each of the plurality of pocket-forming portions includes a circumferentially extending portion connecting two axially extending portions,
   the plurality of pocket-forming portions are equi-spaced circumferentially around the axis of the unison ring assembly, and
   each of the plurality of pocket-forming portions is attached to the backing plate, the backing plate being spaced from the circumferentially extending portion to form a corresponding radially outwardly opening pocket, with each pocket accommodating a respective one of the lever arms, and each lever arm being operably connected to a respective one of the pitch change spindles.

2. The unison ring assembly as claimed in claim 1, wherein each of the plurality of pocket-forming portions is 'C'-shaped in circumferential cross-section.

3. The unison ring assembly as claimed in claim 1, wherein the plurality of pocket-forming portions is formed integrally.

4. The unison ring assembly as claimed in claim 3, wherein the backing plate comprises a plurality of backing plate portions, each of the plurality of backing plate portions corresponding to a respective one of the pocket-forming portions.

\* \* \* \* \*